United States Patent
Suzuki et al.

(10) Patent No.: US 6,492,289 B1
(45) Date of Patent: Dec. 10, 2002

(54) LEAD-FREE GLAZE AND SPARK PLUG

(75) Inventors: Hirofumi Suzuki, Kuwana (JP); Toshiya Nakamura, Toyokawa (JP); Yoshiki Morita, Kariya (JP)

(73) Assignee: Denso Corporation, Kariya (JP)

(*) Notice: Subject to any disclaimer, the term of this patent is extended or adjusted under 35 U.S.C. 154(b) by 0 days.

(21) Appl. No.: 09/576,181

(22) Filed: May 23, 2000

(30) Foreign Application Priority Data

May 24, 1999 (JP) .......................... 11-143638
Apr. 6, 2000 (JP) .......................... 2000-104938

(51) Int. Cl.$^7$ .......................... C03C 8/04; C03C 3/066
(52) U.S. Cl. .......................... 501/14; 501/26; 501/21; 501/79; 313/118; 427/126.2
(58) Field of Search .......................... 501/14, 26, 21, 501/79; 313/118; 427/126.2; 428/426, 428, 432

(56) References Cited

U.S. PATENT DOCUMENTS

| | | | |
|---|---|---|---|
| 4,120,733 A | | 10/1978 | Knapp |
| 4,256,497 A | | 3/1981 | Knapp |
| 4,376,169 A | * | 3/1983 | Eppler |
| 4,446,241 A | * | 5/1984 | Francel et al. |
| 4,590,171 A | | 5/1986 | Nigrin |
| 4,877,758 A | * | 10/1989 | Lee et al. |
| 5,149,565 A | | 9/1992 | Johnson et al. |
| 5,200,369 A | * | 4/1993 | Clifford et al. |
| 5,244,848 A | * | 9/1993 | Clifford et al. |
| 5,246,890 A | * | 9/1993 | Aitken et al. |
| 5,252,521 A | * | 10/1993 | Roberts |
| 5,306,674 A | * | 4/1994 | Ruderer et al. |
| 5,326,591 A | * | 7/1994 | Roberts |
| 5,378,408 A | * | 1/1995 | Carroll et al. |
| 5,468,695 A | * | 11/1995 | Carroll et al. |
| 5,518,968 A | | 5/1996 | Knapp |
| 5,525,553 A | * | 6/1996 | Brocheton et al. |
| 5,677,250 A | * | 10/1997 | Knapp |
| 5,707,909 A | * | 1/1998 | Heitmann et al. |
| 5,783,507 A | * | 7/1998 | Sakoske |
| 5,843,853 A | * | 12/1998 | Heitmann et al. |
| 5,849,649 A | * | 12/1998 | Poole |
| 5,900,319 A | * | 5/1999 | Sakoske |
| 6,022,624 A | * | 2/2000 | Sakoske |
| 6,184,166 B1 | * | 2/2001 | Hares et al. |
| 6,207,285 B1 | * | 3/2001 | Sakoske et al. |
| 6,235,667 B1 | * | 5/2001 | Paloschi et al. |

FOREIGN PATENT DOCUMENTS

| | | |
|---|---|---|
| EP | 509792 | 10/1992 |
| EP | 788204 | 8/1997 |
| EP | 829936 | 3/1998 |
| EP | 959542 | 11/1999 |
| GB | 2068933 | 8/1981 |
| GB | 2263478 | 7/1993 |
| GB | 2294261 | 4/1996 |
| JP | 10-115424 | 5/1998 |
| JP | 10-144448 | 5/1998 |
| JP | 10-167756 | 6/1998 |
| JP | 11-43351 | 2/1999 |
| JP | 11-106234 | 4/1999 |

OTHER PUBLICATIONS

Derwent Abstract 1992–055401 & SU001636361A Kharkov.
Derwent Abstract 1992–047015 & SU001648909A Romanov.
Derwent Abstract 1991–367107 & SU001620426A Niistroikeramika.
Derwent Abstract 1990–245162 & SU001539175A Kharkov.
Derwent Abstract 1986–331311 & SU001229192A Car Electric Equip.

* cited by examiner

Primary Examiner—M. Alexander Elve
Assistant Examiner—Colleen P. Cooke
(74) Attorney, Agent, or Firm—Nixon & Vanderhye P.C.

(57) ABSTRACT

A lead-free glaze that can be fired at a low temperature, a spark plug for which it is used, and a spark plug production method are provided. The lead-free glaze is for coating onto ceramic materials. This lead-free glaze contains 16–49 wt % of $SiO_2$, 15–35 wt % of $B_2O_3$, 0–10 wt % of $Al_2O_3$ and 0–10 wt % of ZnO. A spark plug is provided that comprises coating the lead-free glaze onto the surface of an insulator and firing.

10 Claims, 1 Drawing Sheet

LEAD-FREE GLAZE AND SPARK PLUG

BACKGROUND OF THE INVENTION

1. Field of the Invention

The present invention relates to a lead-free glaze, a spark plug on which it is used, and a method of producing the spark plug.

2. Description of the Related Art

A spark plug insulator is an example of an insulator coated with a glaze. The glaze is coated onto the insulator after which the insulator is fired simultaneous to sealing parts in the hole in the insulator.

It is necessary that the conditions under which parts are sealed into the hole of this insulator are such that the temperature is no higher than 900° C. to prevent oxidation of the stem.

There has been a demand for lead-free glaze in recent years to accommodate environmental concerns. However, it is difficult to fire lead-free glaze onto an insulator at a temperature of 900° C. or lower. Thus, it is no longer possible to perform firing simultaneous to sealing parts in the hole of the insulator.

In consideration of this problem of the prior art, the object of the present invention is to provide a lead-free glaze that allows firing at low temperatures, a spark plug in which it is used, and a method of producing the glaze.

SUMMARY OF THE INVENTION

A first aspect of the present invention is a lead-free glaze for coating ceramic materials containing 16–49 wt % of $SiO_2$, 15–35 wt % of $B_2O_3$, 0–10 wt % of $Al_2O_3$ and 0–10 wt % of ZnO.

As a result of having the above constitution, the lead-free glaze of the present invention can be fired onto an insulator even at a temperature of 900° C. or lower. In addition, since this lead-free glaze does not contain lead, it is suitable for environmental protection.

In addition, since the lead-free glaze of the present invention can be fired at a low temperature of 900° C. or lower, if the ceramic material is a spark plug insulator, oxidation of the stem inserted into the hole of the insulator can be prevented. Consequently, firing of the coated glaze and sealing of parts in the hole of the insulator can be carried out simultaneously.

The following provides an explanation of the composition of the lead-free glaze of the present invention.

$SiO_2$ and $B_2O_3$ are the main components of borosilicate glass. Regarding $SiO_2$ and $B_2O_3$, the melting point of a glaze tends to increase as the amount of $SiO_2$ increases, and the ratio of $SiO_2/(SiO_2+B_2O_3)$ is preferably 50–70 wt %. If the ratio is less than 50 wt %, the water resistance of the glaze decreases resulting in the risk of the glass component eluting in water and deteriorating. If the ratio exceeds 70 wt %, the melting point rises resulting in a risk of the smoothness of the glazed surface decreasing.

The content of $SiO_2$ is 16–49 wt %. If the $SiO_2$ content is less than 16 wt %, there is the risk of the water resistance of the glaze decreasing. If the $SiO_2$ content exceeds 49 wt %, the melting point of the glaze rises resulting in a risk of the smoothness of the glazed surface decreasing.

The content of $B_2O_3$ is 15–35 wt %. If the $B_2O_3$ content is less than 15 wt %, the melting point of the glaze rises resulting in a risk of the smoothness of the glazed surface decreasing. If the $B_2O_3$ content exceeds 35 wt %, there is the risk of the water resistance of the glaze decreasing.

$Al_2O_3$ demonstrates the effect of improving the water resistance of the glaze when added in a minute amount, and prevents the glass component from eluting and deteriorating in water. The content of $Al_2O_3$ is 0–10 wt %. If the $Al_2O_3$ exceeds 10 wt %, the viscosity during firing increases resulting in the risk of the smoothness of the glazed surface decreasing. The content of $Al_2O_3$ is preferably 2–10 wt %. If less than 2 wt %, there is the risk of a reduction in the effect of improving the water resistance of the glass.

ZnO stabilizes the glass without increasing the viscosity during firing. In addition, ZnO also has the effect of suppressing increases in the coefficient of linear expansion of the glaze. The content of ZnO is 0–10 wt %. If the ZnO content exceeds 10 wt %, the transparency of the glazed surface becomes poor.

The above lead-free glaze also preferably contains one type or two or more types of components selected from the group consisting of CaO, BaO and MgO. This is because BaO, CaO and MgO stabilize the glass without increasing the viscosity during firing.

The above lead-free glaze also preferably contains one type or two or more types of components selected from the group consisting of $Bi_2O_3$, $ZrO_2$, $TiO_2$, CeO and FeO.

Although $Bi_2O_3$ lowers the melting point of the glaze, if added in large amounts, it results in the risk of the glazed surface losing it smoothness.

$ZrO_2$ has the effect of stabilizing the glass and lowering the coefficient of linear expansion, while also increasing the ceramic strength. On the other hand, the addition of $ZrO_2$ in large amounts causes clouding.

Although $TiO_2$, CeO and FeO have the effect of preventing discoloration of the ceramic material by increasing weather resistance, addition of these components in large amounts conversely colors the glaze.

Thus, these components are preferably blended so that the necessary coefficient of linear expansion is obtained. As a result, the glass components in the glaze can be stabilized, discoloration of the ceramic material can be prevented, and the melting point of the glaze can be lowered.

Moreover, the above lead-free glaze also preferably contains one type or two or more types of components selected from the group consisting of $Li_2O$, $Na_2O$ and $K_2O$. $Li_2O$, $Na_2O$ and $K_2O$ are alkaline metal oxides that lower the melting point of the glaze. The addition of these components improves the smoothness of the glazed surface.

The above lead-free glaze further preferably contains 2–30 wt % of BaO. BaO has a potent effect of suppressing increases in viscosity during firing, and results in a smooth glazed surface when added in an amount of 2 wt % or more. If the BaO content is less than 2 wt %, there is the risk of the viscosity of the glaze increasing. In addition, if the BaO content exceeds 30 wt %, there is the risk of an increase in the coefficient of linear expansion.

Moreover, the above lead-free glaze preferably contains 1–10 wt % of $ZrO_2$. $ZrO_2$ stabilizes the glass in the glaze and has the effect of lowering the coefficient of linear expansion. Consequently, the strength of the ceramic material can be increased by coating a ceramic material with glaze containing $ZrO_2$. On the other hand, if the $ZrO_2$ content is less than 1 wt %, there is the risk of an increase in the coefficient of linear expansion of the glaze, while if the $ZrO_2$ content exceeds 10 wt %, there is the risk of the glaze becoming clouded.

The above lead-free glaze also preferably contains 1–25 wt % of $Bi_2O_3$. $Bi_2O_3$ has the effect of lowering the melting point of the glaze. If the $Bi_2O_3$ content is less than 1 wt %, there is the risk of reducing the effect of lowering the melting point of the glaze. If the $Bi_2O_3$ content exceeds 25 wt %, there is the risk of the glazed surface losing its smoothness.

The above lead-free glaze preferably contains the following components:

$SiO_2$: 35–49 wt %
$B_2O_3$: 20–35 wt %
$Al_2O_3$: 2–10 wt %
ZnO: 0–10 wt %
BaO: 2–25 wt %
$ZrO_2$: 1–10 wt %
$Bi_2O_3$: 1–15 wt % and,
at least one type of $LiO_2$, $Na_2O$ or $K_2O$: 0–10 wt %.

If the content of $SiO_2$ is less than 35 wt %, the water resistance of the glaze decreases resulting in the risk of the glass component eluting in water and deteriorating. If the $SiO_2$ content exceeds 49 wt %, the melting point of the glaze rises resulting in the risk of decreased smoothness of the glazed surface.

If the content of $B_2O_3$ is less than 20 wt %, the melting point of the glaze rises resulting in the risk of decreased smoothness of the glazed surface. If the $B_2O_3$ content exceeds 35 wt %, there is the risk of the water resistance of the glaze decreasing.

If the content of $Al_2O_3$ is less than 2 wt %, there is the risk of decreasing the effect of improving the water resistance of the glaze by addition of $Al_2O_3$. If the $Al_2O_3$ content exceeds 10 wt %, viscosity during firing increases resulting the risk of a decrease in the smoothness of the glazed surface.

If the content of ZnO exceeds 10 wt %, there is the risk of a decrease in transparency of the glazed surface.

If the content of BaO is less than 2 wt %, there is the risk of the effect of suppressing increases in viscosity during firing decreasing and, if the BaO content exceeds 25 wt %, there is the risk of an increase in the coefficient of linear expansion.

If the content of $ZrO_2$ is less than 1 wt %, there is the risk of a decrease in the ceramic strength. If the $ZrO_2$ content exceeds 10 wt %, there is the risk of clouding of the glaze.

If the content of $Bi_2O_3$ is less than 1 wt %, there is the risk of an increase in the melting point of the glaze. If the $Bi_2O_3$ content exceeds 15 wt %, there is the risk of the glazed surface losing its smoothness.

If the total content of at least one type of $LiO_2$, $Na_2O$ or $K_2O$ exceeds 10 wt %, there is the risk of the coefficient of linear expansion of the glaze layer increasing, or insulation resistance at a high temperature of, for example, 500° C., decreasing.

A second aspect of the present invention is a spark plug comprising coating the surface of the insulator with the above lead-free glaze and firing.

Since the spark plug has a lead-free glaze according to the present invention fired onto the surface of the insulator, firing can be performed at low temperatures enabling it to be manufactured safely. In addition, the glazed surface following firing is smooth. Consequently, the plug cap is attached easily. In addition, there is little adhesion of debris and insulation resistance can be secured from a normal temperature to 500° C.

In addition, the lead-free glaze may be fired after adding minute amounts of clay component such as kaolin and bentonite or organic binder to the glass components. In this case, the composition of the lead-free glaze after firing is the same as the above-mentioned composition before firing.

If the insulator is made of alumina and if the glaze layer has a coefficient of linear expansion of $50-80\times10^{-7}/°$ C. that approximates that of the alumina, although firing can be carried out without cracking and so forth, the coefficient of linear expansion of the glass increases rapidly at the transition point. Thus, it is preferable that the coefficient of linear expansion of the glaze at 100–300° C. be $50-75\times10^{-7}/°$ C. In the case of deviation from this range, there is the risk of the occurrence of cracks in the glaze.

A third aspect of the present invention is a method of producing a spark plug comprising coating the above lead-free glaze onto the surface of an insulator and firing at a temperature of 900° C. or lower. In this production method, the insulator is coated with a lead-free glaze that allows the above low-temperature firing. Consequently, the lead-free glaze can be fired at a low temperature of 900° C. or lower, allowing firing to be carried out at low cost.

A fourth aspect of the present invention is a method of producing a spark plug comprising coating the above lead-free glaze onto the surface of an insulator, inserting a part into the hole of the insulator and heating the insulator and part to simultaneously fire the above lead-free glaze and seal the above part.

The present production method uses a lead-free glaze that allows the above low-temperature firing. In the present production method, since firing of the lead-free glaze and sealing of the above part by sealing glass and so forth are carried out simultaneously, a spark plug can be obtained easily.

The heating temperature of the above insulator is preferably 900° C. or lower. As a result, a spark plug can be obtained both easily and at low cost.

DESCRIPTION OF THE PREFERRED EMBODIMENTS

Embodiment 1

Figure 1:
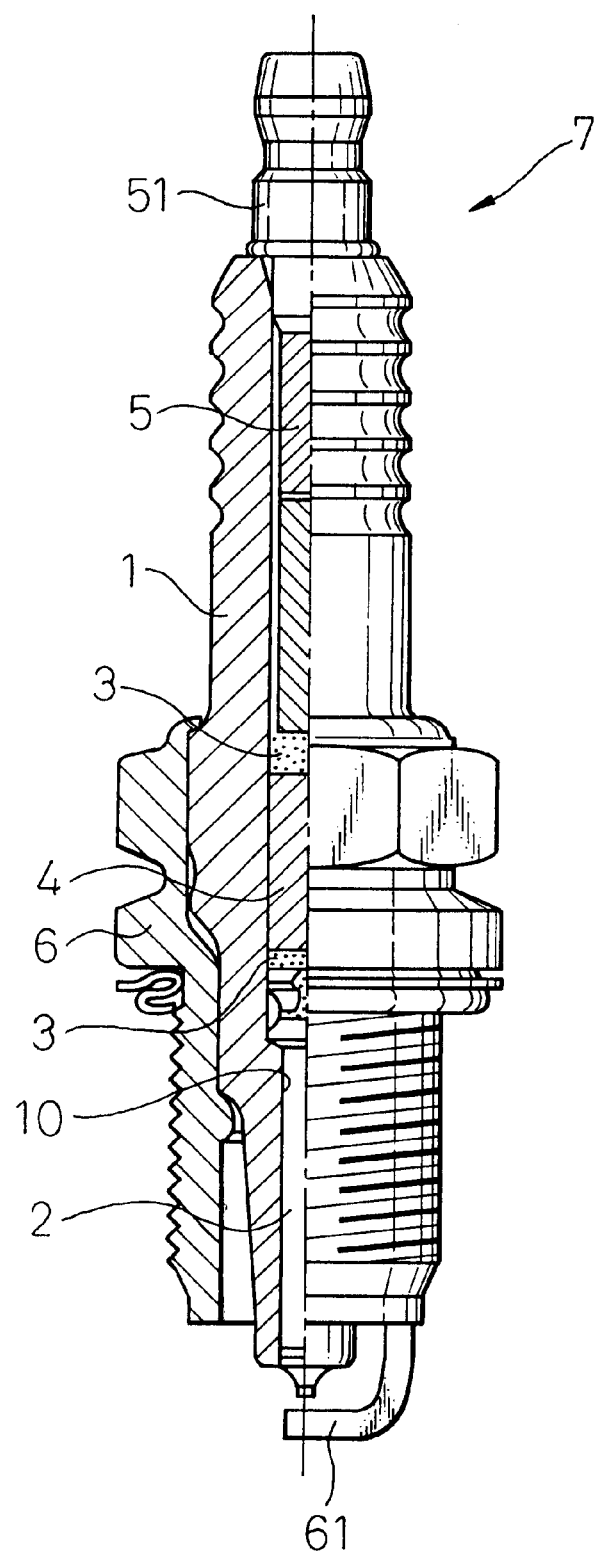
FIG. 1 is a cross-sectional view of a spark plug of a first embodiment of the present invention.

The following provides an explanation of the lead-free glaze as claimed in the embodiments of the present invention along with a spark plug for which it is used with reference to FIG. 1.

As shown in Table 1, raw materials of the lead-free glaze are blended at the prescribed ratios, melted at 1400° C. and cooled to obtain glass flakes. The glass flakes were wet-crushed with a ball mill to a mean particle size of 5–15 μm followed by the addition of 11 parts by weight of a clay component such as kaolin or bentonite and 0.4 parts by weight of organic binder relative to 100 parts by weight of crushed glass to obtain a glaze slurry. Furthermore, an example of organic binder used is carboxymethylcellulose (CMC).

This glaze slurry was coated onto the surface of an alumina insulator after molding and firing, either by spraying or with a roller.

Next, as shown in FIG. 1, a center electrode 2 was inserted into hole 10 of insulator 1, a sealing glass 3 and a resistor 4 were filled into hole 10 and finally, stem 5 having terminal 51 was inserted. Next, this was placed in an electric furnace set to 850° C. to simultaneously fire the glaze and seal the center electrode, stem and resistor.

Following firing and sealing, the fired insulator 1 was inserted into housing 6 to which a ground electrode 61 was attached and fixed.

As a result, spark plug 7 was obtained.

The composition and coefficient of linear expansion of the above glaze, and the insulation resistance and status of the glazed surface of the glaze layer on the surface of the insulator of the resulting spark plug were measured. Those results are shown in Table 1.

The status of the glazed surface was evaluated and indicated as ○ if the glazed surface was transparent and smooth, or as × if the glazed surface had poor transparency and was rough, at a glaze thickness of 10–70 μm.

Strength was evaluated and indicated as ○ if the strength of the insulator alone increased by 30 wt % or more as a result of coating with glaze, or as × if the increase in strength was less than 30 wt %.

According to the table, glaze comprised of the raw materials of samples 4–10 (products of the present invention) demonstrated coefficients of linear expansion of 63.8–74.7×10$^{-7}$/° C. and insulation resistance values of 100–1200 MΩ (500° C.), and insulation between stem 5 and housing 6 was secured. In addition, the glazed surfaces were smooth and firing was complete. In addition, the strength of the insulator was improved as a result of coating with glaze. Moreover, the installed state of the plug gap (not shown) that guides a high voltage from the ignition coil was satisfactory.

On the other hand, the glazed surfaces of samples C1–C3, C11 and C12 (comparative products) was rough, and the insulation resistance values of samples C1 and C2 were low. The insulator bending strength of samples C1, C2 and C12 was also low.

TABLE 1

| Sample No. | Composition (wt %) | | | | | | | | | | | Coef of lin. exp. × 10$^{-7}$/° C. | Ins. Res. MΩ (500° C.) | Glazed surface | Ins. bend str. |
|---|---|---|---|---|---|---|---|---|---|---|---|---|---|---|---|
| | $SiO_2$ | $B_2O_3$ | $Li_2O$ | $Na_2O$ | $K_2O$ | ZnO | CaO | BaO | $Al_2O_3$ | $ZrO_2$ | $Bi_2O_3$ | | | | |
| C1 | 53.5 | 17.0 | 1.0 | 2.2 | 1.9 | — | 10.9 | — | 13.5 | — | — | 58.2 | 70 | x | x |
| C2 | 49.4 | 18.5 | 0.6 | 4.5 | 5.5 | 3.5 | 7.5 | — | 10.5 | — | — | 71.7 | 80 | x | x |
| C3 | 49.4 | 18.5 | 0.6 | 2.2 | 1.2 | 2.5 | 7.5 | 7.6 | 10.5 | — | — | 61.0 | 800 | x | ○ |
| 4 | 43.0 | 21.5 | — | 4.7 | 1.2 | 1.6 | 6.7 | 18.0 | 3.3 | — | — | 72.3 | 300 | ○ | ○ |
| 5 | 43.0 | 21.5 | — | 2.7 | 1.2 | 3.6 | 6.7 | 18.0 | 3.3 | — | — | 63.8 | 1200 | ○ | ○ |
| 6 | 43.0 | 23.5 | — | 5.2 | 1.6 | 2.1 | 4.7 | 17.0 | 2.9 | — | — | 74.7 | 160 | ○ | ○ |
| 7 | 41.0 | 25.5 | — | 5.0 | 2.0 | 2.0 | 5.3 | 15.8 | 3.4 | — | — | 72.0 | 450 | ○ | ○ |
| 8 | 38.0 | 27.5 | — | 5.2 | 1.6 | 2.1 | 4.7 | 17.0 | 2.9 | — | — | 73.3 | 100 | ○ | ○ |
| 9 | 38.0 | 28.0 | 2.0 | 2.0 | 2.5 | 4.0 | — | 6.5 | 2.0 | 6.0 | 9.0 | 64.2 | 320 | ○ | ○ |
| 10 | 38.0 | 28.0 | 1.0 | 2.0 | 2.5 | 4.0 | — | 6.5 | 2.0 | 3.0 | 13.0 | 65.1 | 630 | ○ | ○ |
| C11 | 38.0 | 28.0 | 2.0 | 2.0 | 3.0 | 4.0 | — | 7.0 | 2.0 | 11.0 | 3.0 | 63.7 | 520 | x | ○ |
| C12 | 38.5 | 24.0 | 2.0 | 2.0 | — | 5.3 | 1.3 | 4.0 | 1.4 | — | 25.0 | 64.3 | 600 | x | x |

According to the above, as a result of the lead-free glaze of the present invention containing 16–49 wt % of $SiO_2$, 15–35 wt % of $B_2O_3$, 0–10 wt % of $Al_2O_3$ and 0–10 wt % of ZnO, firing can be performed at a low temperature of 900° C. or lower, and a glaze layer can be formed having high insulation resistance.

In addition, it as found that even more satisfactory results are obtained as a result of the above lead-free glaze containing $SiO_2$: 35–49 wt %, $B_2O_3$: 20–35 wt %, $Al_2O_3$: 2–10 wt %, ZnO: 0–10 wt %, BaO: 2–25 wt %, $ZrO_2$: 1–10 wt %, $Bi_2O_3$: 1–15 wt % and at least one type of $LiO_2$, $Na_2O$ or $K_2O$: 0–10 wt %.

Furthermore, the present invention is not limited to the above embodiments.

What is claimed is:

1. A lead-free glaze for coating ceramic material containing:

$SiO_2$: 35–49 wt %

$B_2O_3$: 20–35 wt %

$Al_2O_3$: 2–10 wt %

ZnO: 0–10wt %

BaO: 2–25 wt %

$ZrO_2$: 1–10 wt %

$Bi_2O_3$: 1–15 wt % and, at least one compound selected from $Li_2O$, $Na_2O$ and $K_2O$ in the amount up to 10 wt %, wherein the ratio of $SiO_2/(SiO_2+B_2O_3)$ is 50 to 70 wt %.

2. A spark plug produced by coating the surface of an insulator with a lead-free glaze according to claim 1 and firing.

3. A production method of a spark plug comprising coating the lead-free glaze according to claim 1 onto the surface of an insulator and firing at a temperature of 900° C. or lower.

4. A production method of a spark plug comprising coating the lead-free glaze according to claim 1 onto the surface of an insulator, inserting a part into the hole of the insulator and heating the insulator and part to simultaneously fire the lead-free glaze and seal the above part.

5. A production method of a spark plug according to claim 4 wherein the heating temperature of the insulator is 900° C. or lower.

6. A spark plug comprising coating the surface of an insulator with a lead-free glaze according to claim 1 and firing.

7. A production method of a spark plug comprising coating the a lead-free glaze according to claim 1 onto the surface of an insulator and firing at a temperature of 900° C. or lower.

8. A production method of a spark plug comprising coating the a lead-free glaze according to claim 1 onto the surface of an insulator, inserting a part into the hole of the insulator and heating the insulator and part to simultaneously fire the lead-free glaze and seal the above part.

9. A production method of a spark plug according to claim 8 wherein the heating temperature of the insulator is 900° C. or lower.

10. A lead-free glaze according to claim 1, wherein the ratio of $SiO_2/(SiO_2+B_2O_3)$ is 50 to about 66 wt %.

* * * * *